United States Patent
Chae et al.

(10) Patent No.: US 7,606,320 B2
(45) Date of Patent: Oct. 20, 2009

(54) APPARATUS AND METHOD FOR SPACE-FREQUENCY BLOCK CODING/DECODING IN A COMMUNICATION SYSTEM

(75) Inventors: Chan-Byoung Chae, Seoul (KR); Hong-Sil Jeong, Seoul (KR); Young-Kwon Cho, Suwon-si (KR); Dong-Seek Park, Yongin-si (KR); Katz Marcos Daniel, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 630 days.

(21) Appl. No.: 11/156,689

(22) Filed: Jun. 20, 2005

(65) Prior Publication Data
US 2005/0281350 A1    Dec. 22, 2005

(30) Foreign Application Priority Data
Jun. 18, 2004    (KR) .................. 10-2004-0045526

(51) Int. Cl.
*H04B 7/02*    (2006.01)
(52) U.S. Cl. .................. 375/267; 375/299; 375/341; 375/347; 375/349; 375/135; 375/136; 375/146; 375/147
(58) Field of Classification Search ............ 375/267, 375/299, 341, 347, 349, 135, 136, 146, 147
See application file for complete search history.

(56) References Cited

U.S. PATENT DOCUMENTS

| | | | |
|---|---|---|---|
| 6,542,556 B1* | 4/2003 | Kuchi et al. | 375/299 |
| 2003/0073464 A1* | 4/2003 | Giannakis et al. | 455/562 |
| 2003/0095533 A1* | 5/2003 | Joo et al. | 370/343 |
| 2004/0257978 A1* | 12/2004 | Shao et al. | 370/208 |

OTHER PUBLICATIONS

Weifeng Su et al., Obtaining Full-Diversity Space-Frequency Codes From Space-Time Codes Via Mapping, IEEE Transactions on Signal Processing, vol. 51, No. 11, Nov. 2003, pp. 2905-2916.
Xiaoli Ma et al., Full-Diversity Full-Rate Complex-Field Space-Time Coding, IEEE Transactions on Signal Processing, vol. 51, No. 11, Nov. 2003, pp. 2917-2930.
Vahid Tarokh et al., Space-Time Block Codes from Orthogonal Designs, IEEE Transactions on Information Theory, vol. 45, No. 5, Jul. 1999, pp. 1456-1467.
Siavash M. Alamouti; A Simple Transmit Diversity Technique for Wireless Communications, IEEE Journal on Select Areas in Communications, vol. 16, No. 8, Oct. 1998, pp. 1451-1458.
Shouyin Liu et al., Pair Space-Time Trellis Codes and Linear Constellation Precoding for MIMO-OFDM Systems; The 14th IEEE 2003 International Symposium on Personal, Indoor and Mobile Radio Communication Proceedings, pp. 2257-2261.

* cited by examiner

*Primary Examiner*—Shuwang Liu
*Assistant Examiner*—Kabir A Timory
(74) *Attorney, Agent, or Firm*—The Farrell Law Firm, LLP

(57) ABSTRACT

An apparatus and method for SFBC coding and decoding in a communication system using a plurality of ($N_t$) Tx antennas are provided. In a transmitter using $N_t$ transmit antennas, a pre-coder pre-codes an input symbol sequence using a pre-coding matrix. The pre-coding matrix is produced by puncturing a unitary matrix in a predetermined method. An encoder generates a plurality of vectors by grouping the symbols of the pre-coded symbol sequence by twos, space-frequency maps each of the vectors by encoding each of the vectors in an Alamouti coding scheme, and provides each of the space-frequency mapped symbols to a predetermined OFDM modulator.

23 Claims, 9 Drawing Sheets

APPARATUS AND METHOD FOR SPACE-FREQUENCY BLOCK CODING/DECODING IN A COMMUNICATION SYSTEM

PRIORITY

This application claims priority under 35 U.S.C. § 119 to an application entitled "Apparatus And Method For Space-Frequency Block Coding/Decoding In An Orthogonal Frequency Division Multiplexing System" filed in the Korean Intellectual Property Office on Jun. 18, 2004 and assigned Ser. No. 2004-45526, the contents of which are herein incorporated by reference.

BACKGROUND OF THE INVENTION

1. Field of the Invention

The present invention relates generally to an apparatus and method for providing transmit antenna diversity in a wireless communication system, and in particular, to an apparatus and method for space-frequency block coding (SFBC) to achieve a full diversity gain and a full rate in a mobile communication system using multiple antennas.

2. Description of the Related Art

The basic issue in communications is how to efficiently and reliably transmit data on channels. In addition to satisfying the demand for a high-speed communication system capable of processing and transmitting video and wireless data in addition to the traditional voice service, future-generation multimedia mobile communication systems, now under active study, increase system efficiency using an appropriate channel coding scheme.

Generally, in the wireless channel environment of a mobile communication system, unlike that of a wired channel environment, a transmission signal inevitably experiences loss due to several factors such as multipath interference, shadowing, wave attenuation, time-varying noise, and fading.

The resulting information loss causes a severe distortion to the actual transmission signal, degrading the whole system performance. In order to reduce the information loss, many error control techniques are usually adopted depending on the characteristics of channels to thereby increase system reliability. One basic technique is to use an error correction code.

Multipath fading is relieved by diversity techniques in the wireless communication system. The diversity techniques are classified into time diversity, frequency diversity, and antenna diversity. Antenna diversity uses multiple antennas. This diversity scheme is further branched into receive (Rx) antenna diversity using a plurality of Rx antennas, transmit (Tx) antenna diversity using a plurality of Tx antennas, and multiple-input multiple-output (MIMO) using a plurality of Tx antennas and a plurality of Rx antennas. MIMO is a special case of space-time coding (STC) that extends coding in the time domain to the space domain by transmission of a signal encoded in a predetermined coding method through a plurality of Tx antennas, with the aim to achieve a lower error rate.

V. Tarokh, et al. proposed STBC as one of methods of efficiently applying the antenna diversity scheme (see "Space-Time Block Coding from Orthogonal Designs", IEEE Trans. On Info., Theory, Vol. 45, pp. 1456-1467, July 1999). The Tarokh STBC scheme is an extension of the transmit antenna diversity scheme of S. M. Alamouti (see, "A Simple Transmit Diversity Technique for Wireless Communications", IEEE Journal on Selected Area in Communications, Vol. 16, pp. 1451-1458, October 1988), for two or more Tx antennas.

FIG. 1 is a block diagram of a transmitter in a mobile communication system using a conventional STBC. As proposed by Tarokh, the transmitter is comprised of a modulator 100, a serial-to-parallel (S/P) converter 102, an STBC coder 104, and four Tx antennas 106, 108, 110 and 112. Referring to FIG. 1, the modulator 100 modulates input information data (or coded data) in a predetermined modulation scheme. The modulation scheme can be one of binary phase shift keying (BPSK), quadrature phase shift keying (QPSK), quadrature amplitude modulation (QAM), pulse amplitude modulation (PAM), and phase shift keying (PSK).

The S/P converter 102 parallelizes serial modulation symbols received from the modulator 100, $s_1, s_2, s_3, s_4$. The STBC coder 104 creates eight symbol combinations by STBC-encoding the four modulation symbols, $s_1, s_2, s_3, s_4$ and sequentially transmits them through the four Tx antennas 106 to 112. A coding matrix used to generate the eight symbol combinations is expressed as Equation (1):

$$G_4 = \begin{bmatrix} s_1 & s_2 & s_3 & s_4 \\ -s_2 & s_1 & -s_4 & s_3 \\ -s_3 & s_4 & s_1 & -s_2 \\ -s_4 & -s_3 & s_2 & s_1 \\ s_1^* & s_2^* & s_3^* & s_4^* \\ -s_2^* & s_1^* & -s_4^* & s_3^* \\ -s_3^* & s_4^* & s_1^* & -s_2^* \\ -s_4^* & -s_3^* & s_2^* & s_1^* \end{bmatrix} \quad (1)$$

where $G_4$ denotes the coding matrix for symbols transmitted through the four Tx antennas 106 to 112 and $s_1, s_2, s_3, s_4$ denote the input four symbols to be transmitted. The number of the columns of the coding matrix is equal to the number of the Tx antennas and the number of the rows corresponds to the time intervals required to transmit the four symbols. Thus, the four symbols are transmitted through the four Tx antennas for eight time intervals. Specifically, for a first time interval, $s_1$ is transmitted through the first Tx antenna 106, $s_2$ through the second Tx antenna 108, $s_3$ through the third Tx antenna 110, and $s_4$ through the fourth Tx antenna 112. Similarly, $-s^*_4, -s^*_3, s^*_2, -s^*_1$ are transmitted through the first to fourth Tx antennas 106 to 112, respectively for an eighth time interval. That is, the STBC coder 104 sequentially provides the symbols of an $i^{th}$ column in the coding matrix to an $i^{th}$ Tx antenna.

As described above, the STBC coder 104 generates the eight symbol sequences using the four input symbols and their conjugates and negatives and transmits them through the four Tx antennas 106 to 112 for eight time intervals. Since the symbol sequences for the respective Tx antennas, that is, the columns of the coding matrix are mutually orthogonal, a diversity gain as high as a diversity order is achieved.

FIG. 2 is a block diagram of a receiver in the mobile communication system using the conventional STBC scheme. The receiver is the counterpart of the transmitter illustrated in FIG. 1. The receiver is comprised of a plurality of Rx antennas 200 to 202, a channel estimator 204, a signal combiner 206, a detector 208, a parallel-to-serial (P/S) converter 210, and a demodulator 212. The first to $P^{th}$ Rx antennas 200 to 202 provide signals received from the four Tx antennas of the transmitter illustrated in FIG. 1 to the channel estimator 204 and the signal combiner 206. The channel estimator 204 estimates channel coefficients representing channel gains from the Tx antennas 106 to 112 to the Rx antennas 200 to 202 using the signals received from the first to $P^{th}$ Rx antennas 200 to 202. The signal combiner 206 combines the signals received from the first to $P^{th}$ Rx antennas 200 to 202 with the channel coefficients in a predetermined method. The detector 208 generates hypothesis symbols by multiplying the combined symbols by the channel coefficients, calculates decision statistics for all possible transmitted symbols from the transmitter using the hypothesis symbols, and detects the actual transmitted symbols through threshold detection. The P/S converter 210 serializes the parallel symbols received from the detector 208. The demodulator 212 demodulates the serial symbol sequence in a predetermined demodulation method, thereby recovering the original information bits.

As stated earlier, the Alamouti STBC technique offers the benefit of achieving as high a diversity order as the number of Tx antennas, namely a full diversity order, without sacrificing data rate by transmitting complex symbols through two Tx antennas only. By comparison, the Tarokh STBC scheme extended from the Alamouti STBC scheme achieves a full diversity order using an STBC in the form of a matrix with orthogonal columns, as described with reference to FIGS. 1 and 2. However, because four complex symbols are transmitted for eight time intervals, the Tarokh STBC scheme brings a decrease by half in the data rate. In addition, since it takes eight time intervals to completely transmit one block with four complex symbols, reception performance is degraded due to channel changes within the block over a fast fading channel. In other words, the transmission of complex symbols through four or more Tx antennas requires 2N time intervals for N symbols, causing a longer latency and a decrease in the data rate.

To achieve a full rate in a MIMO system that transmits a complex signal through three or more Tx antennas, the Giannakis group presented a full-diversity, full-rate (FDFR) STBC for four Tx antennas using constellation rotation over a complex field. This FDFR STBC scheme will be described below.

FIG. 3 is a block diagram of a transmitter in a mobile communication system using the conventional Giannakis STBC scheme. As illustrated in FIG. 3, the transmitter includes a modulator 300, a pre-coder 302, a space-time mapper 304, and a plurality of Tx antennas 306, 308, 310 and 312. The modulator 300 modulates input information data (or coded data) in a predetermined modulation scheme such as BPSK, QPSK, QAM, PAM or PSK. The pre-coder 302 pre-codes $N_t$ modulation symbols received from the modulator 300, $d_1$, $d_2$, $d_3$, $d_4$ such that signal rotation occurs in a signal space, and outputs the resulting $N_t$ symbols. For simplicity, four Tx antennas are assumed. Let a sequence of four modulation symbols from the modulator 300 be denoted by d. The pre-coder 302 generates a complex vector r by computing the modulation symbol sequence, d using Equation (2):

$$r = \Theta d = \begin{bmatrix} 1 & \alpha_0^1 & \alpha_0^2 & \alpha_0^3 \\ 1 & \alpha_1^1 & \alpha_1^2 & \alpha_1^3 \\ 1 & \alpha_2^1 & \alpha_2^2 & \alpha_2^3 \\ 1 & \alpha_3^1 & \alpha_3^2 & \alpha_3^3 \end{bmatrix} \begin{bmatrix} d_1 \\ d_2 \\ d_3 \\ d_4 \end{bmatrix} = \begin{bmatrix} r_1 \\ r_2 \\ r_3 \\ r_4 \end{bmatrix} \quad (2)$$

where $\Theta$ denotes a pre-coding matrix. The Giannakis group uses a Vandermonde matrix, being a unitary one, as the pre-coding matrix. In the pre-coding matrix, $a_i$ is given as Equation (3):

$$a_i = \exp(j2\pi(i+1/4)/4), i=0,1,2,3 \quad (3)$$

The Giannakis STBC scheme uses four Tx antennas and is easily extended to more than four Tx antennas, as well. The space-time mapper 304 STBC-encodes the pre-coded symbols in the following method according to Equation (4):

$$S = \begin{bmatrix} r_1 & 0 & 0 & 0 \\ 0 & r_2 & 0 & 0 \\ 0 & 0 & r_3 & 0 \\ 0 & 0 & 0 & r_4 \end{bmatrix} \quad (4)$$

where S is a coding matrix for symbols transmitted through the four Tx antennas 306 to 312. The number of the columns of the coding matrix is equal to the number of the Tx antennas and the number of the rows corresponds to the time required to transmit the four symbols. That is, the four symbols are transmitted through the four Tx antennas for the four time intervals.

Specifically, for a first time interval, $r_1$ is transmitted through the first Tx antenna 306, with no signals through the other Tx antennas 308, 310 and 312. For a second time interval, $r_2$ is transmitted through the second Tx antenna 308, with no signals through the other Tx antennas 306, 310 and 312. For a third time interval, $r_3$ is transmitted through the third Tx antenna 310, with no signals through the other Tx antennas 306, 308, and 312. For a fourth time interval, $r_4$ is transmitted through the fourth Tx antenna 310, with no signals through the other Tx antennas 306, 308 and 310. Upon receipt of the four symbols on a radio channel for the four time intervals, a receiver (not shown) recovers the modulation symbol sequence, d, by maximum likelihood (ML) decoding.

Taejin Jung and Kyungwhoon Cheun proposed a pre-coder and concatenated code with an excellent coding gain in 2003, compared to the Giannakis STBC. Jung and Cheun enhance the coding gain by concatenating Alamouti STBCs instead of using a diagonal matrix proposed by the Giannakis group. For convenience sake, their STBC is called "Alamouti FDFR STBC".

The Alamouti FDFR STBC will be described below. FIG. 4 is a block diagram of a transmitter in a mobile communication system using the conventional Alamouti FDFR STBC for four Tx antennas. As illustrated in FIG. 4, the transmitter includes a pre-coder 400, a mapper 402, a delay 404, two Alamouti coders 406 and 408, and four Tx antennas 410, 412, 414 and 416.

Referring to FIG. 4, the pre-coder 400 pre-codes four input modulation symbols, $d_1$, $d_2$, $d_3$, $d_4$ such that signal rotation occurs in a signal space. For the input of a sequence of the four modulation symbols, d, the pre-coder 400 generates a complex vector, r, according to Equation (5):

$$r = \Theta d = \begin{bmatrix} 1 & \alpha_0^1 & \alpha_0^2 & \alpha_0^3 \\ 1 & \alpha_1^1 & \alpha_1^2 & \alpha_1^3 \\ 1 & \alpha_2^1 & \alpha_2^2 & \alpha_2^3 \\ 1 & \alpha_3^1 & \alpha_3^2 & \alpha_3^3 \end{bmatrix} \begin{bmatrix} d_1 \\ d_2 \\ d_3 \\ d_4 \end{bmatrix} = \begin{bmatrix} r_1 \\ r_2 \\ r_3 \\ r_4 \end{bmatrix} \quad (5)$$

where $a_i = \exp(j2\pi(i+1/4)/4)$, $i=0,1,2,3$.

The mapper 402 groups the four pre-coded symbols by twos and outputs two vectors each including two elements, $[r_1, r_2]^T$ and $[r_3, r_4]^T$ to the Alamouti coder 406 and the delay 404, respectively. The delay 404 delays the second vector $[r_3, r_4]^T$ for one time interval. Thus, the first vector $[r_1, r_2]^T$ is provided to the Alamouti coder 406 in a first time interval and the second vector $[r_3, r_4]^T$ is provided to the Alamouti coder 408 in a second time interval. The Alamouti coder refers to a coder that operates in the Alamouti STBC scheme.

The Alamouti coder 406 encodes $[r_1, r_2]^T$ so that it is transmitted through the first and second Tx antennas 410 and 412 for the first and second time intervals. The Alamouti coder 408 encodes $[r_3, r_4]^T$ so that it is transmitted through the third and fourth Tx antennas 414 and 416 for the third and fourth time intervals. A coding matrix used to transmit the four symbols from the mapper 402 through the multiple antennas is shown in Equation (6):

$$S = \begin{bmatrix} r_1 & r_2 & 0 & 0 \\ -r_2^* & r_1^* & 0 & 0 \\ 0 & 0 & r_3 & r_4 \\ 0 & 0 & -r_4^* & r_3^* \end{bmatrix} \quad (6)$$

Unlike the coding matrix illustrated in Equation (4), the above coding matrix is designed to be an Alamouti STBC rather than a diagonal matrix. The use of the Alamouti STBC scheme increases a coding gain.

In the matrix S, an $i^{th}$ row denotes transmission in an $i^{th}$ time interval and a $j^{th}$ column denotes transmission through a $j^{th}$ Tx antenna. Specifically, $r_1$ and $r_2$ are transmitted through the first and second Tx antennas 410 and 412, respectively for a first time interval. $-r^*_2$ and $r^*_1$ are transmitted through the first and second Tx antennas 410 and 412, respectively for a second time interval. For a third time interval, $r_3$ and $r_4$ are transmitted through the third and fourth Tx antennas 414 and 416, respectively. For a fourth time interval, $-r^*_4$ and $r^*_3$ are transmitted through the third and fourth Tx antennas 414 and 416, respectively.

This Alamouti FDFR STBC, however, has the distinctive shortcoming of increased coding complexity because the transmitter needs to perform computations between all elements of the pre-coding matrix and an input vector, for pre-coding. For example, for four Tx antennas, since 0 is not included in the elements of the pre-coding matrix, computation must be carried out on 16 elements. Also, the receiver needs to perform maximum-likelihood (ML) decoding with a large volume of computation in order to decode the signal, d transmitted by the transmitter. While the FDFR STBC process has deficiencies, FDFR SFBC techniques are yet to be developed. Accordingly, a need exists for developing an FDFR SFBC technique with a minimal complexity and a minimal computation volume.

Orthogonal frequency division multiplexing (OFDM) is a promising technology to reduce channel fading in $4^{th}$ generation (4G) mobile communication systems. Special consideration is being given to multi-user OFDM supporting multiple users in which each user is identified in the frequency domain. Since the implementation of an OFDM system involves consideration of channel changes in the frequency domain, space-frequency antenna diversity must also be exploited. That is, an SFBC scheme needs to be developed for the OFDM system.

SUMMARY OF THE INVENTION

An object of the present invention is to substantially solve at least the above problems and/or disadvantages with existing coding techniques and to provide at least the advantages described below for improved coding/decoding techniques. Accordingly, an object of the present invention is to provide an apparatus and method for FDFR SFBC coding/decoding in a MIMO mobile communication system. Another object of the present invention is to provide an apparatus and method for SFBC coding/decoding to minimize computation volume and complexity in a MIMO mobile communication system. A further object of the present invention is to provide an apparatus and method for FDFR SFBC coding/decoding to decrease coding and decoding complexities in a MIMO mobile communication system. Still another object of the present invention is to provide an apparatus and method for providing antenna diversity using an SFBC. Yet another object of the present invention is to provide an apparatus and method for SFBC coding/decoding for application to an OFDM communication system. The above objects are achieved by providing an apparatus and method for SFBC coding and decoding in an OFDM system using a plurality of Tx antennas.

According to one aspect of the present invention, in a transmitter using a plurality of ($N_t$) transmit antennas in an OFDM communication system, a pre-coder pre-codes an input symbol sequence using a pre-coding matrix produced by puncturing a unitary matrix in a predetermined method. A space-frequency coder space-frequency encodes the pre-coded symbol sequence using a predetermined coding matrix. It is preferred that the pre-coding matrix is produced by puncturing predetermined $$\frac{N_t}{2}$$

columns in an $N_t \times N_t$ Vandermonde matrix, sequentially grouping the rows of the punctured matrix by twos, and shifting one row of each group.

According to another aspect of the present invention, in a receiver in an OFDM communication system where a transmitter uses a plurality of ($N_t$) transmit antennas, at least one OFDM demodulator OFDM-demodulates a signal received through at least one receive antenna. A matrix generator generates a channel response matrix by multiplying a channel coefficient matrix (H) by a predetermined pre-coding matrix (Θ). A signal combiner calculates a Hermitian matrix of the channel response matrix, calculates a vector of size $N_t$ by multiplying the Hermitian matrix by the OFDM-demodulated signal, and divides the vector into two vectors. It is preferred that the pre-coding matrix is produced by puncturing predetermined $$\frac{N_t}{2}$$

columns in an $N_t \times N_t$ Vandermonde matrix, sequentially grouping the rows of the punctured matrix by twos, and shifting one row of each group.

According to a further aspect of the present invention, in a transmission method in an OFDM communication system using a plurality of ($N_t$) transmit antennas, an input complex symbol sequence is pre-coded using a pre-coding matrix produced by puncturing a unitary matrix in a predetermined method. The pre-coded symbol sequence is space-frequency encoded using a predetermined coding matrix. It is preferred that the pre-coding matrix is produced by puncturing predetermined $$\frac{N_t}{2}$$

columns in an $N_t \times N_t$ Vandermonde matrix, sequentially grouping the rows of the punctured matrix by twos, and shifting one row of each group.

According to still another aspect of the present invention, in a reception method in an OFDM communication system where a transmitter uses a plurality of (N$_t$) transmit antennas, a signal received through at least one receive antenna is OFDM-demodulated. A channel response matrix is generated by multiplying a channel coefficient matrix (H) by a predetermined pre-coding matrix (Θ). A Hermitian matrix of the channel response matrix is calculated; a vector of size N$_t$ is calculated by multiplying the Hermitian matrix by the OFDM-demodulated signal; and the vector is divided into two vectors. Symbols transmitted from the transmitter are estimated by decoding each of the two vectors in a predetermined decoding method. It is preferred that the pre-coding matrix is produced by puncturing predetermined $$\frac{N_t}{2}$$

columns in an N$_t$×N$_t$ Vandermonde matrix, sequentially grouping the rows of the punctured matrix by twos, and shifting one row of each group.

According to yet another aspect of the present invention, in a method of generating a pre-coding matrix in a system where transmission data is pre-coded and then space-frequency encoded, a unitary matrix is generated. Half the columns of the unitary matrix are punctured. The pre-coding matrix is generated by sequentially grouping the rows of the punctured matrix by twos and shifting one row of each group.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention is intended to provide an FDFR SFBC scheme in an OFDM mobile communication system using multiple antennas. Particularly, the present invention provides an apparatus and method for FDFR SFBC coding/decoding with a reduced volume of computation and a low complexity.

Figure 5:
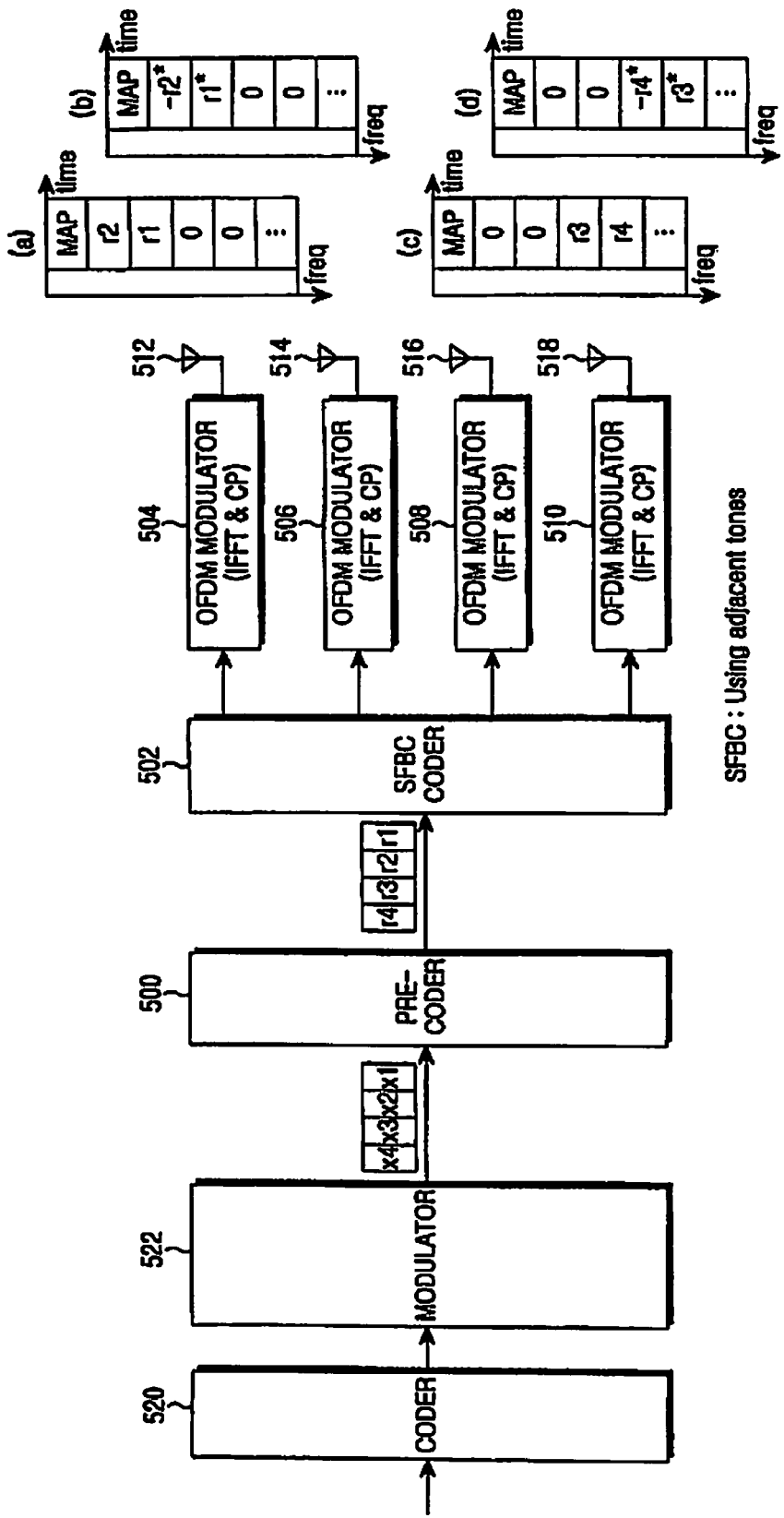
FIG. 5 is a block diagram of a transmitter in an OFDM mobile communication system using an SFBC scheme for a plurality of (N$_t$) Tx antennas according to an embodiment of the present invention.

FIG. 5 is a block diagram of a transmitter in an OFDM mobile communication system using an SFBC scheme for a plurality of (N$_t$) Tx antennas according to an embodiment of the present invention. It is assumed that N$_t$=4. As illustrated, the transmitter includes a pre-coder 500, an SFBC coder 502, a plurality of OFDM modulators 504, 506, 508 and 510, and a plurality of Tx antennas 512, 514, 516 and 518. Information data is typically encoded in a coder and modulated in a modulator. The pre-coder 500 pre-codes four modulation symbols, x$_1$, x$_2$, x$_3$, x$_4$ such that signal rotation takes place in a signal space and outputs a vector having four symbols, r$_1$, r$_2$, r$_3$, r$_4$. Particularly, the pre-coder 500 encodes the input symbols in a pre-coding matrix according to the present invention and thus generates the complex vector, r. The pre-coding matrix will be described later in great detail below.

The SFBC coder 502 groups the four pre-coded symbols by twos, thereby producing two vectors each having two elements, [r$_1$, r$_2$] and [r$_3$, r$_4$]. It then encodes each of the two vectors in the Alamouti coding scheme, for space-frequency mapping. A coding matrix involved in the operation of the SFBC coder 502 is set forth as Equation (7):

$$\begin{bmatrix} r_1 & -r_2^* & 0 & 0 \\ r_2 & r_1^* & 0 & 0 \\ 0 & 0 & r_3 & -r_4^* \\ 0 & 0 & r_4 & r_3^* \end{bmatrix} \quad (7)$$

The number of the columns of the coding matrix is equal to the number of the Tx antennas and the number of the rows is equal to the number of the subcarriers used. For example, a symbol mapped to the second subcarrier counted from a predetermined reference and transmitted through the second Tx antenna is r*$_1$. Specifically, the SFBC coder 502 generates four antenna signals or vectors [r$_1$, r$_2$, 0, 0], [−r*$_2$, r*$_1$, 0, 0], [0, 0, r$_3$, r$_4$] and [0, 0, −r*$_4$, r*$_3$] and outputs [r$_1$, r$_2$, 0, 0] to the first OFDM modulator 504, [−r*$_2$, r*$_1$, 0, 0] to the second OFDM modulator 506, [0, 0, r$_3$, r$_4$] to the third OFDM modulator 508, and [0, 0, −r*$_4$, r*$_3$] to the fourth OFDM modulator 510.

The first OFDM modulator 504 inverse-fast-Fourier-transform (IFFT)-processes the code symbols [r$_1$, r$_2$, 0, 0] by allocating them to predetermined four successive subcarriers, converts the IFFT signals to radio frequency (RF) signals, and transmits the RF signals through the first Tx antenna 512. In practice, r$_2$ and r$_1$ are mapped to first and second subcarriers and nulls are mapped to third and fourth subcarriers among the four successive subcarriers. The second OFDM modulator 506 IFFT-processes the code symbols [−r*$_2$, r*$_1$, 0, 0] by allocating them to predetermined four successive subcarriers, converts the IFFT signals to RF signals, and transmits the RF signals through the second Tx antenna 514. The third OFDM modulator 508 IFFT-processes the code symbols [0, 0, $r_3$, $r_4$] by allocating them to predetermined four successive subcarriers, converts the IFFT signals to RF signals, and transmits the RF signals through the third Tx antenna 516. The fourth OFDM modulator 510 IFFT-processes the code symbols [0, 0, $-r^*_4$, $r^*_3$] by allocating them to predetermined four successive subcarriers, converts the IFFT signals to RF signals, and transmits the RF signals through the fourth Tx antenna 518. Reference characters (a), (b), (c) and (d) denote representations of the symbols transmitted through the first to fourth Tx antennas 512 to 518 in a time-frequency plane.

As described above, the present invention characteristically pre-codes transmission data in the pre-coder, maps the pre-coded symbols in space and frequency using the Alamouti coding scheme, and transmits the space-frequency mapped symbols through a plurality of Tx antennas for one time interval.

A description of a receiver in a mobile communication system using the Alamouti FDFR STBC scheme of Taejin Jung and Kyungwhoon Cheun will be made before that of the operation of the pre-coder 500 illustrated in FIG. 5.

A signal received at the receiver is shown in Equation (8):

$$y = \begin{bmatrix} y_1 \\ y_2^* \\ y_3 \\ y_4^* \end{bmatrix} = \frac{1}{\sqrt{2}} \begin{bmatrix} h_1 & h_2 & 0 & 0 \\ -h_2^* & h_1^* & 0 & 0 \\ 0 & 0 & h_3^* & h_4^* \\ 0 & 0 & -h_4^* & h_3^* \end{bmatrix} \begin{bmatrix} r_1 \\ r_2 \\ r_3 \\ r_4 \end{bmatrix} + \begin{bmatrix} n_1 \\ n_2^* \\ n_3 \\ n_4^* \end{bmatrix} = Hr + n \quad (8)$$

As noted from Equation (8), the signal y can be expressed as a vector including signals received at the receiver for four time intervals and their conjugates. The vector y is multiplied by $H^H$ to estimate a signal transmitted from the transmitter. H is a channel response matrix. This operation is expressed as Equation (9):

$$\hat{r} = H^H y = \begin{bmatrix} \hat{r}_1 \\ \hat{r}_2 \\ \hat{r}_3 \\ \hat{r}_4 \end{bmatrix}$$

$$= \frac{1}{2} \begin{bmatrix} |h_1|^2 + |h_2|^2 & 0 & 0 & 0 \\ 0 & |h_1|^2 + |h_2|^2 & 0 & 0 \\ 0 & 0 & |h_3|^2 + |h_4|^2 & 0 \\ 0 & 0 & 0 & |h_3|^2 + |h_4|^2 \end{bmatrix} \begin{bmatrix} r_1 \\ r_2 \\ r_3 \\ r_4 \end{bmatrix} + \begin{bmatrix} \hat{n}_1 \\ \hat{n}_2^* \\ \hat{n}_3 \\ \hat{n}_4^* \end{bmatrix}$$

(9)

Figure 1:
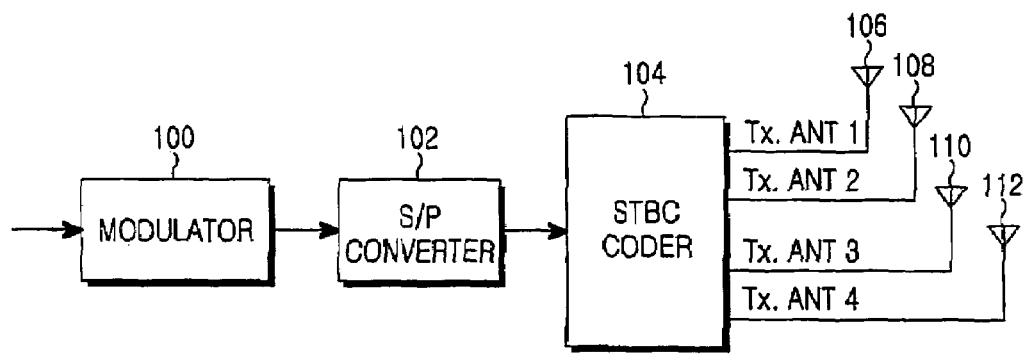
FIG. 1 is a block diagram of a transmitter in a mobile communication system using a conventional Tarokh STBC scheme.
Figure 2:
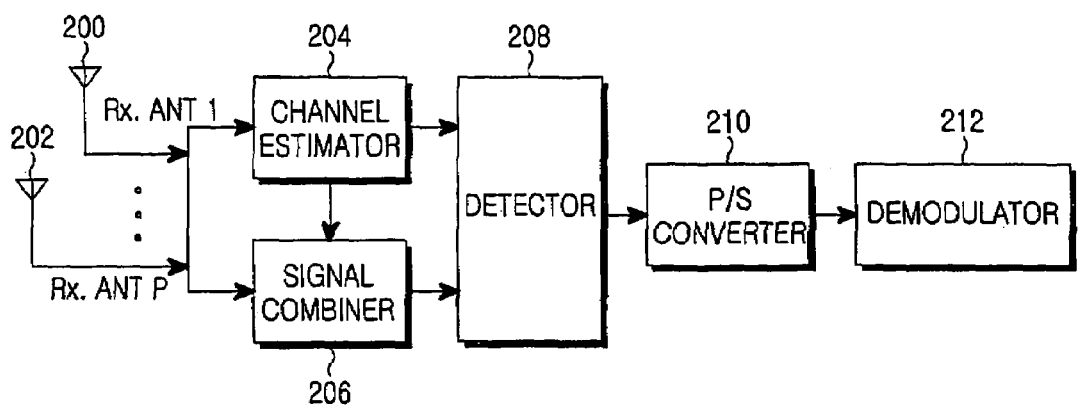
FIG. 2 is a block diagram of a receiver corresponding to the transmitter illustrated in FIG. 1
Figure 3:
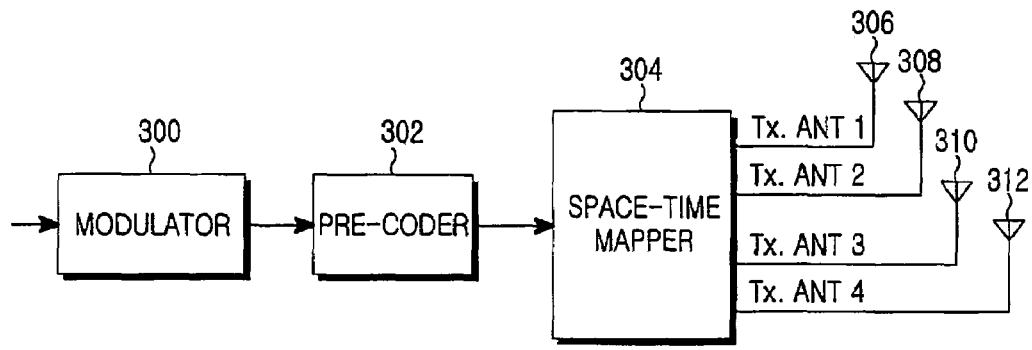
FIG. 3 is a block diagram of a transmitter in a mobile communication system using a conventional Giannakis STBC scheme.
Figure 4:
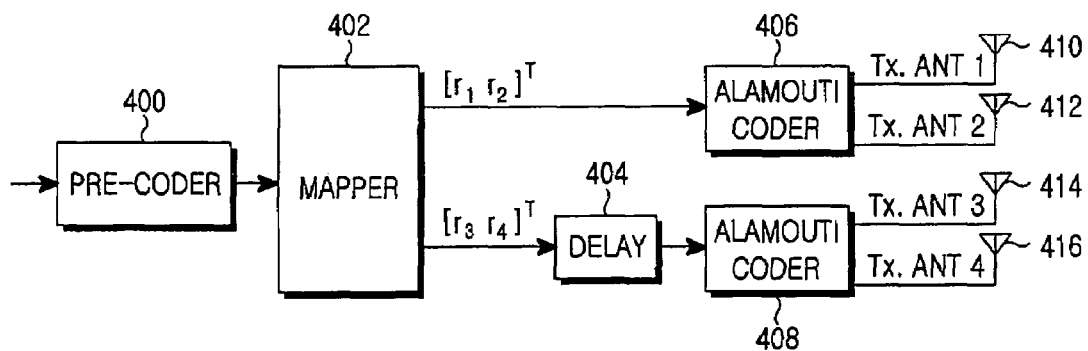
FIG. 4 is a block diagram of a receiver in a mobile communication system using a conventional Alamouti FDFR STBC scheme with four Tx antennas as proposed by Taejin Jung and Kyungwhoon Cheun.

Equation (9) reveals that since all symbols experience two channels, the pre-coder 400 illustrated in FIG. 4 is not needed. In this context, the present invention proposes a pre-coder that minimizes coding and decoding complexities, that is, computation volume, achieving the same performance, compared to the system as proposed by Taejin Jung and Kyungwhoon Cheun.

Figure 6:
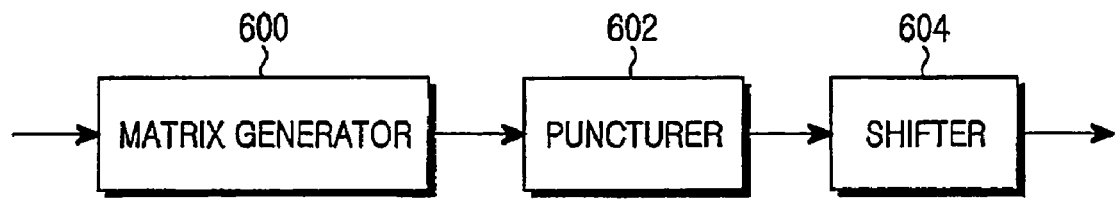
FIG. 6 is a detailed block diagram of a pre-coding matrix generator in a pre-coder illustrated in FIG. 5.

FIG. 6 is a detailed block diagram of a pre-coding matrix generator in the pre-coder 500 according to the embodiment of the present invention. As illustrated, the pre-coding matrix generator includes a matrix generator 600, a puncturer 602, and a shifter 604. The matrix generator 600 generates a Vandermonde matrix according to the number of the Tx antennas.

For $N_t$ Tx antennas, an $N_t \times N_t$ Vandermonde matrix is generated. The puncturer 602 punctures $$\frac{N_t}{2}$$

columns in the $N_t \times N_t$ Vandermonde matrix. The puncturing is to substitute 0s for the elements of the $$\frac{N_t}{2}$$

columns. The shifter 604 shifts even-numbered rows in the punctured Vandermonde matrix, thereby moving non-punctured elements to the punctured positions. For the same effect, odd-numbered rows can be shifted, or the rows can be grouped into twos and one row of each group is shifted.

As described above, the pre-coding matrix is generated by puncturing of $$\frac{N_t \times N_t}{2}$$

elements in the $N_t \times N_t$ matrix, thereby remarkably reducing coding and decoding complexities (computation volume) according to the present invention. While the pre-coder 500 generates the pre-coding matrix in the above embodiment of the present invention, it can be further contemplated as another embodiment that a preliminarily generated pre-coding matrix is stored in a memory and read out for pre-coding by the pre-coder 500 when needed.

The operation of the pre-coding matrix generator is summarized as follows.

(1) Generation of Vandermonde Matrix

An $N_t \times N_t$ Vandermonde matrix as shown below in Equation (10) is generated. $N_t$ is the number of Tx antennas, as stated earlier.

$$\Theta = \begin{bmatrix} 1 & a_0^1 & a_0^2 & \ldots & a_0^{N_t-1} \\ 1 & a_1^1 & a_1^2 & \ldots & a_1^{N_t-1} \\ \vdots & \vdots & \ddots & \ldots & \vdots \\ 1 & a_{N_t-1}^1 & a_{N_t-1}^2 & \ldots & a_{N_t-1}^{N_t-1} \end{bmatrix} \quad (10)$$

where $a_i = \exp(j2\pi(i+1/4)/N_t)$, $i = 0, 1, 2, \ldots, N_t-1$.

(2) Puncturing of Vandermonde Matrix $$\frac{N_t \times N_t}{2}$$

elements are punctured in the $N_t \times N_t$ Vandermonde matrix by replacing the $$\frac{N_t \times N_t}{2}$$

elements with 0s. The resulting punctured matrix is shown in Equation (11):

$$\Theta = \begin{bmatrix} 1 & \alpha_0^1 & \ldots & \alpha_0^{N_t/2-1} & 0 & \ldots & 0 \\ 1 & \alpha_1^1 & \ldots & \alpha_1^{N_t/2-1} & 0 & \ldots & 0 \\ \vdots & \vdots & \ddots & \ldots & \ldots & \ddots & \vdots \\ 1 & \alpha_{N_t-1}^1 & \ldots & \alpha_{N_t-1}^{N_t/2-1} & 0 & \ldots & 0 \end{bmatrix} \quad (11)$$

(3) Shifting of Even-Numbered Rows in Punctured Matrix

A final pre-coding matrix is generated by shifting even-numbered rows in the punctured $N_t \times N_t$ Vandermonde matrix. The shifting is to move non-punctured elements to punctured positions in the even-numbered rows. Thus, as shown in Equation (12):

$$\Theta = \begin{bmatrix} 1 & \alpha_0^1 & \ldots & \alpha_0^{N_t/2-1} & 0 & \ldots & 0 \\ 0 & 0 & \ldots & 0 & 1 & \ldots & \alpha_1^{N_t/2-1} \\ \vdots & \vdots & \ddots & \ldots & \ldots & \ddots & \vdots \\ 1 & \alpha_{N_t-2}^1 & \ldots & \alpha_{N_t-2}^{N_t/2-1} & 0 & \ldots & 0 \\ 0 & 0 & \ldots & 0 & 1 & \ldots & \alpha_{N_t-1}^{N_t/2-1} \end{bmatrix} \quad (12)$$

Even if $a_i$ is set such that $a_0 = a_1$, $a_2 = a_3$, and $a_{N_t-2} = a_{N_t-1}$, there is no change in performance. Instead of the even-numbered rows, the odd-numbered rows can be shifted, effecting the same.

As described above, for $N_t$ Tx antennas, the operation of the pre-coder 500 is implemented by Equation (13):

$$r = \Theta x \quad (13)$$

$$= \begin{bmatrix} 1 & \alpha_0^1 & \cdots & \alpha_0^{N_t/2-1} & 0 & 0 & \cdots & 0 \\ 0 & 0 & \cdots & 0 & 1 & \alpha_0^1 & \cdots & \alpha_0^{N_t/2-1} \\ \vdots & \vdots & \ddots & \ldots & \ldots & \ldots & \vdots & \vdots \\ 1 & \alpha_{N_t/2-1}^1 & \cdots & \alpha_{N_t/2-1}^{N_t/2-1} & 0 & 0 & \cdots & 0 \\ 0 & 0 & \cdots & 0 & 1 & \alpha_{N_t/2-1}^1 & \cdots & \alpha_{N_t/2-1}^{N_t/2-1} \end{bmatrix}$$

$$\begin{bmatrix} x_1 \\ x_2 \\ \vdots \\ x_{N_t-1} \\ x_{N_t} \end{bmatrix} = \begin{bmatrix} r_1 \\ r_2 \\ \vdots \\ r_{N_t-1} \\ r_{N_t} \end{bmatrix}$$

where $[x_1, x_2, \ldots, x_{N_t-1}, x_{N_t}]$ is an input symbol sequence to the pre-coder 500 and $[r_1, r_2, \ldots, r_{N_t-1}, r_{N_t}]$ is an output symbol sequence from the pre-coder 500.

The elements of the thus-designed pre-coding matrix $\Theta$ must be optimized to maximize the coding gain. This is done by mathematical knowledge or simulation. In accordance with the embodiment of the present invention, pre-coding matrices $\Theta$ with a maximum coding gain are achieved by simulation. These pre-coding matrices are illustrated below.

For an Alamouti FDFR SFBC system with four antennas, the following pre-coding matrix $\Theta$ is available.

$$\Theta = \frac{1}{\sqrt{2}} \begin{bmatrix} 1 & e^{-j\theta_0} & 0 & 0 \\ 0 & 0 & 1 & e^{-j\theta_0} \\ 1 & e^{-j\theta_1} & 0 & 0 \\ 0 & 0 & 1 & e^{-j\theta_1} \end{bmatrix} \quad (14)$$

where $0 \leq \theta_0, \theta_1 \leq 2\pi$, and $|\theta_1 - \theta_2| = 180°$.

For an Alamouti FDFR SFBC system with six antennas, the following pre-coding matrix $\Theta$ is available as set forth in Equation (15).

$$\Theta = \frac{1}{\sqrt{3}} \begin{bmatrix} 1 & e^{-j\frac{5}{9}\pi} & e^{-j\frac{10}{9}\pi} & 0 & 0 & 0 \\ 0 & 0 & 0 & 1 & e^{-j\frac{5}{9}\pi} & e^{-j\frac{10}{9}\pi} \\ 1 & e^{-j\frac{11}{9}\pi} & e^{-j\frac{4}{9}\pi} & 0 & 0 & 0 \\ 0 & 0 & 0 & 1 & e^{-j\frac{11}{9}\pi} & e^{-j\frac{4}{9}\pi} \\ 1 & e^{-j\frac{17}{9}\pi} & e^{-j\frac{16}{9}\pi} & 0 & 0 & 0 \\ 0 & 0 & 0 & 1 & e^{-j\frac{17}{9}\pi} & e^{-j\frac{16}{9}\pi} \end{bmatrix} \quad (15)$$

For an Alamouti FDFR SFBC system with eight or more antennas, the following pre-coding matrix $\Theta$ is available as set forth in Equation (16):

$$\Theta = \frac{1}{\sqrt{N_t/2}} \quad (16)$$

$$\begin{bmatrix} 1 & \alpha_0^1 & \cdots & \alpha_0^{N_t/2-1} & 0 & 0 & \cdots & 0 \\ 0 & 0 & \cdots & 0 & 1 & \alpha_0^1 & \cdots & \alpha_0^{N_t/2-1} \\ \vdots & \vdots & \ddots & \ldots & \ldots & \ddots & \vdots & \vdots \\ 1 & \alpha_{N_t/2-1}^1 & \cdots & \alpha_{N_t/2-1}^{N_t/2-1} & 0 & 0 & \cdots & 0 \\ 0 & 0 & \cdots & 0 & 1 & \alpha_{N_t/2-1}^1 & \cdots & \alpha_{N_t/2-1}^{N_t/2-1} \end{bmatrix}$$

where $a_i = \exp(j2\pi(i+1/4)/N_t)$, $i = 0, 1, 2, \ldots, N_t/2-1$.

Figure 7:
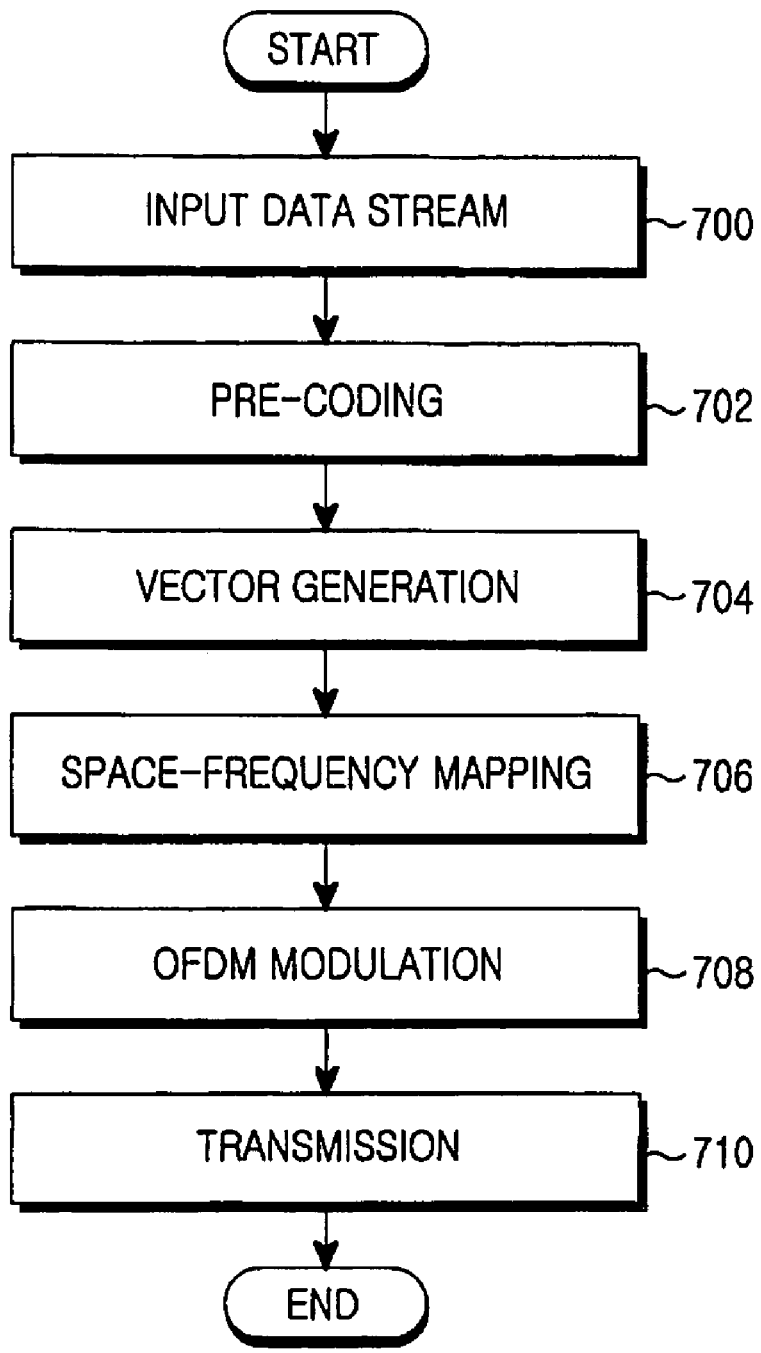
FIG. 7 is a flowchart illustrating a transmission operation in the transmitter illustrated in FIG. 5.

Now a description will be made of the operation of the transmitter illustrated in FIG. 5 with reference to FIG. 7. FIG.

7 is a flowchart illustrating a transmission operation in the transmitter in the OFDM mobile communication system using the SFBC scheme for a plurality of Tx antennas according to the embodiment of the present invention. The following description is made in the context of four Tx antennas. The transmitter receives a data stream to be transmitted, x ([$x_1$, $x_2$, $x_3$, $x_4$]) in step 700. x can be a coded and modulated complex symbol sequence. In step 702, the pre-coder of the transmitter generates a pre-coded symbol sequence r ([$r_1$, $r_2$, $r_3$, $r_4$r ]) by pre-coding the input data stream using a predetermined pre-coding matrix Θ. The pre-coding matrix Θ is created by puncturing a half of a Vandermonde matrix and shifting predetermined rows, as described earlier. Due to the half-puncturing, the pre-coding matrix reduces coding and decoding complexities significantly.

In step 704, the coder groups the symbols of the sequence r by twos, thus producing two vectors [$r_1$, $r_2$] and [$r_3$, $r_4$]. The SFBC maps the two vectors in space and frequency by encoding them in the Alamouti coding scheme in step 706. As a result, four antenna signals are generated, [$r_1$, $r_2$, 0, 0], [$-r^*_2$, $r^*_1$, 0, 0], [0, 0, $r_3$, $r_4$] and [0, 0, $-r^*_4$, $r^*_3$]. Four symbols with nulls forming each antenna signal are allocated to predetermined four successive subcarriers.

In step 708, the four antenna signals are allocated to subcarriers, IFFT-processed, and converted to RF signals, for OFDM modulation. The transmitter then transmits the RF signals through corresponding Tx antennas in step 710. Specifically, [$r_1$, $r_2$, 0, 0] are OFDM-modulated by allocating them to four predetermined subcarriers and transmitting through the first Tx antenna 512. [$-r^*_2$, $r^*_1$,0,0 ] are OFDM-modulated by allocating them to four predetermined subcarriers and transmitting through the second Tx antenna 514. [0, 0, $r_3$, $r_4$] are OFDM-modulated by allocating them to four predetermined subcarriers and transmitting through the third Tx antenna 516. [0, 0, $-r^*_4$, $r^*_3$] are OFDM-modulated by allocating them to four predetermined subcarriers and transmitting through the fourth Tx antenna 518.

Figure 8:
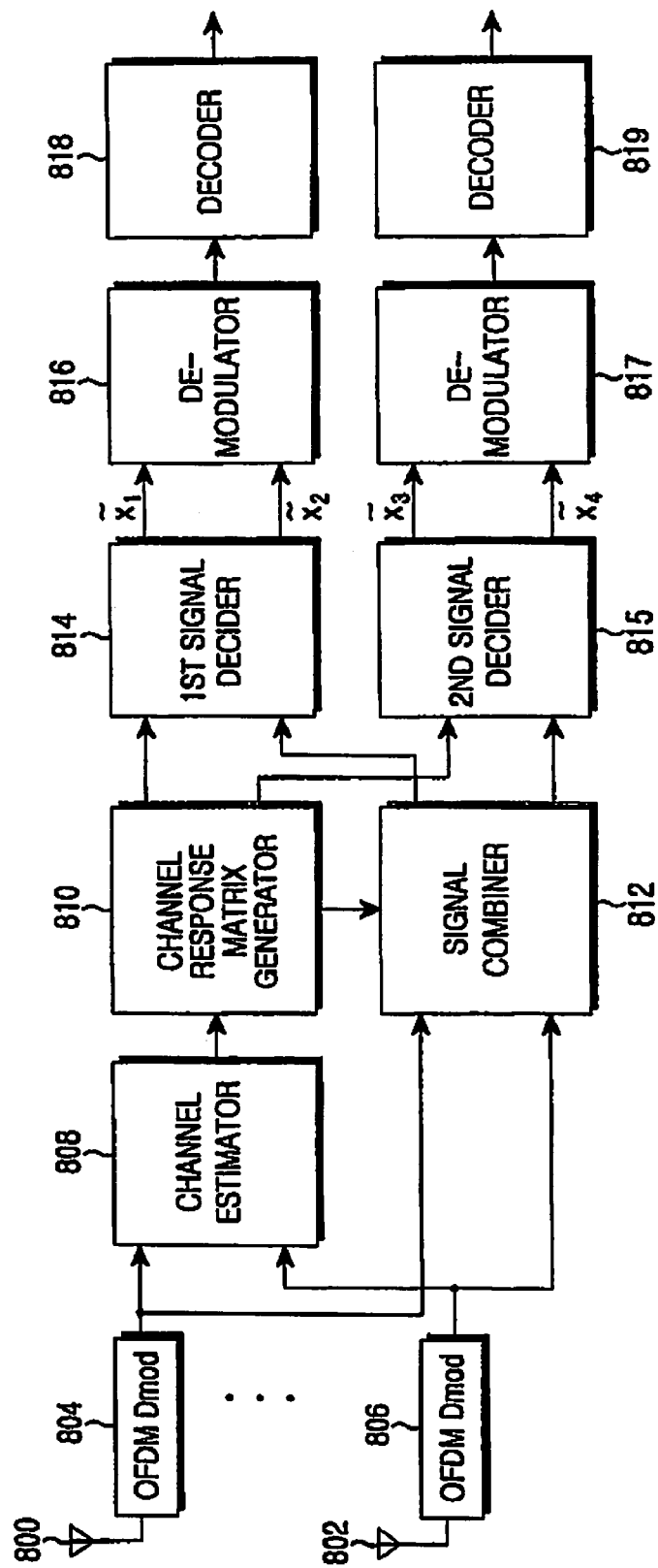
FIG. 8 is a block diagram of a receiver in the OFDM mobile communication system using the SFBC scheme for a plurality of Tx antennas according to the embodiment of the present invention.

A receiver being the counterpart of the transmitter illustrated in FIG. 5 will be described with reference to FIG. 8. FIG. 8 is a block diagram of a receiver in the OFDM mobile communication system using the SFBC scheme according to the embodiment of the present invention. The number of Tx antennas in the transmitter is assumed to be four. As illustrated, the receiver includes a plurality of first to $P^{th}$ Rx antennas 800 to 802, a plurality of OFDM demodulators 804 to 806, a channel estimator 808, a channel response matrix generator 810, a signal combiner 812, and first and second signal deciders 814 and 815. While the embodiment of the present invention is described under the assumption that the number of Tx antennas in the transmitter is different from that of Rx antennas in the receiver, it is obvious that they can be identical.

Referring to FIG. 8, signals transmitted from the Tx antennas 512 to 518 in the transmitter arrive at the first to $P^{th}$ Rx antennas 800 to 802. The Rx antennas 800 to 802 provide the received signals to their corresponding OFDM demodulators 804 to 806. The OFDM demodulators 804 to 806 each convert the received signal into a baseband signal and fast-Fourier-transform (FFT)-processes the baseband signal, for OFDM demodulation, and outputs the OFDM-demodulated data to the channel estimator 808 and the signal combiner 812. The channel estimator 808 estimates channel coefficients representing channel gains from the OFDM-demodulated data.

For one Rx antenna, the received signal y is expressed as Equation (17):

$$y = H\Theta x + n = \frac{1}{2}\begin{bmatrix} h_1 & h_1\alpha_0^1 & h_2 & h_2\alpha_0^1 \\ h_2^* & h_2^*\alpha_0^1 & -h_1^* & -h_1^*\alpha_0^1 \\ h_3 & h_3\alpha_1^1 & h_4 & h_2\alpha_1^1 \\ h_4^* & h_4^*\alpha_1^1 & -h_3^* & -h_3^*\alpha_1^1 \end{bmatrix}\begin{bmatrix} x_1 \\ x_2 \\ x_3 \\ x_4 \end{bmatrix} + \begin{bmatrix} n_1 \\ n_2^* \\ n_3 \\ n_4^* \end{bmatrix} \quad (17)$$

where y is a vector received through the Rx antenna, H is a channel coefficient matrix, Θ is a pre-coding matrix, and n is a noise vector.

The channel estimator 808 channel-estimates the received signal y and outputs the channel estimation result (channel coefficients) to the channel response matrix generator 810. The channel response matrix generator 810 generates a channel response matrix $H_{new}$ using the channel coefficients by Equation (18). As noted from Equation (18), the channel response matrix $H_{new}$ is the product of the channel coefficient matrix H and the known pre-coding matrix Θ. The channel response matrix $H_{new}$ is provided to the signal combiner 812 and the signal deciders 814 and 815.

$$H_{new} = \begin{bmatrix} h_1 & h_1\alpha_0^1 & h_2 & h_2\alpha_0^1 \\ h_2^* & h_2^*\alpha_0^1 & -h_1^* & -h_1^*\alpha_0^1 \\ h_3 & h_3\alpha_1^1 & h_4 & h_2\alpha_1^1 \\ h_4^* & h_4^*\alpha_1^1 & -h_3^* & -h_3^*\alpha_1^1 \end{bmatrix} \quad (18)$$

The signal combiner 812 combines the OFDM-demodulated data with the channel response matrix $H_{new}$ in a predetermined method and outputs a vector of size $N_t$. Specifically, the signal combiner 812 calculates the Hermitian matrix $H_{new}^H$ of the channel response matrix $H_{new}$, multiplies $H_{new}^H$ by the received signal y from the OFDM demodulators 804 to 806, and outputs the resulting vector y'. On the assumption that the vector y' has $N_t$ symbols, the first to the $(N_t/2)^{th}$ symbols are provided to the first signal decider 814 and the $(N_t/2+1)^{th}$ to the $N_t^{th}$ symbols are provided to the second signal decider 815.

The first signal decider 814 estimates symbols transmitted by the transmitter by performing, for example, ML decoding on the vector received from the signal combiner 812 using the channel response matrix $H_{new}$. The second signal decider 815 estimates symbols transmitted from the transmitter by performing, for example, ML decoding on the vector received from the signal combiner 810 using the channel response matrix $H_{new}$. The ML decoding for size $$\frac{N_t}{2}$$

reduces computation volume considerably, compared to ML decoding for size $N_t$.

The operation of the receiver is now summarized in mathematical terms. The Hermitian matrix $H_{new}^H$ is multiplied by the channel response matrix $H_{new}$ as follows in Equation (19):

$$H_{new}^H H_{new} = \begin{bmatrix} A & B & 0 & 0 \\ B & A & 0 & 0 \\ 0 & 0 & A & B \\ 0 & 0 & B & A \end{bmatrix} \quad (19)$$

where $A=|h_1|^2+|h_2|^2+|h_3|^2+|h_1|^4$ and $B=|h_1|^2(a_0^1)^*+|h_2|^2(a_0^1)^*+|h_3|^2(a_1^1)^*+|h_1|^4(a_0^1)^*$.

Continuing, the product of $H_{new}^H$ and y calculated in the signal combiner 812 is set forth in Equation (20):

$$y' = \begin{bmatrix} y'_1 \\ y'^*_2 \\ y'_3 \\ y'^*_4 \end{bmatrix} = H_{new}^H y \quad (20)$$

$$= \frac{1}{\sqrt{2}} \begin{bmatrix} A & B & 0 & 0 \\ B & A & 0 & 0 \\ 0 & 0 & A & B \\ 0 & 0 & B & A \end{bmatrix} \begin{bmatrix} x_1 \\ x_2 \\ x_3 \\ x_4 \end{bmatrix} + H_{new}^H \begin{bmatrix} n_1 \\ n^*_2 \\ n_3 \\ n^*_4 \end{bmatrix}$$

Equation (20) shows that $x_1$ and $x_2$ can be estimated from $y'_1$ and $y'^*_2$, and $x_3$ and $x_4$ can be estimated from $y'_3$ and $y'^*_4$. Thus, the symbols $x_1, x_2, x_3, x_4$ transmitted by the transmitter are estimated by the following Equation (21):

$$\tilde{x}_{1,2} = \arg_{x_{1,2}}^{min} \|y'_{1,2} - px_{1,2}\|_2$$

$$\tilde{x}_{3,4} = \arg_{x_{3,4}}^{min} \|y'_{3,4} - px_{3,4}\|_2 \quad (21)$$

where $$p = \begin{bmatrix} A & B \\ B^* & A \end{bmatrix}, \tilde{x}_{1,2} = \begin{bmatrix} \tilde{x}_1 \\ \tilde{x}_2 \end{bmatrix}, \tilde{x}_{3,4} = \begin{bmatrix} \tilde{x}_3 \\ \tilde{x}_4 \end{bmatrix},$$

$$x_{1,2} = \begin{bmatrix} x_1 \\ x_2 \end{bmatrix}, x_{3,4} = \begin{bmatrix} x_3 \\ x_4 \end{bmatrix}, y'_{1,2} = \begin{bmatrix} y'_1 \\ y'^*_2 \end{bmatrix} \text{ and } y'_{3,4} = \begin{bmatrix} y'_3 \\ y'^*_4 \end{bmatrix}.$$

In this way, the transmitted symbols $x_1, x_2, x_3, x_4$ can be estimated separately as groups $x_1, x_2$ and $x_3, x_4$.

In the above manner, the first signal decider 814 estimates $x_1, x_2$ and outputs the estimated symbols $\tilde{x}_1, \tilde{x}_2$ and the second signal decider 815 estimates $x_3, x_4$ and outputs the estimated symbols $\tilde{x}_3, \tilde{x}_4$. The estimated symbols are recovered to the original information data through demodulation and decoding.

Figure 9:
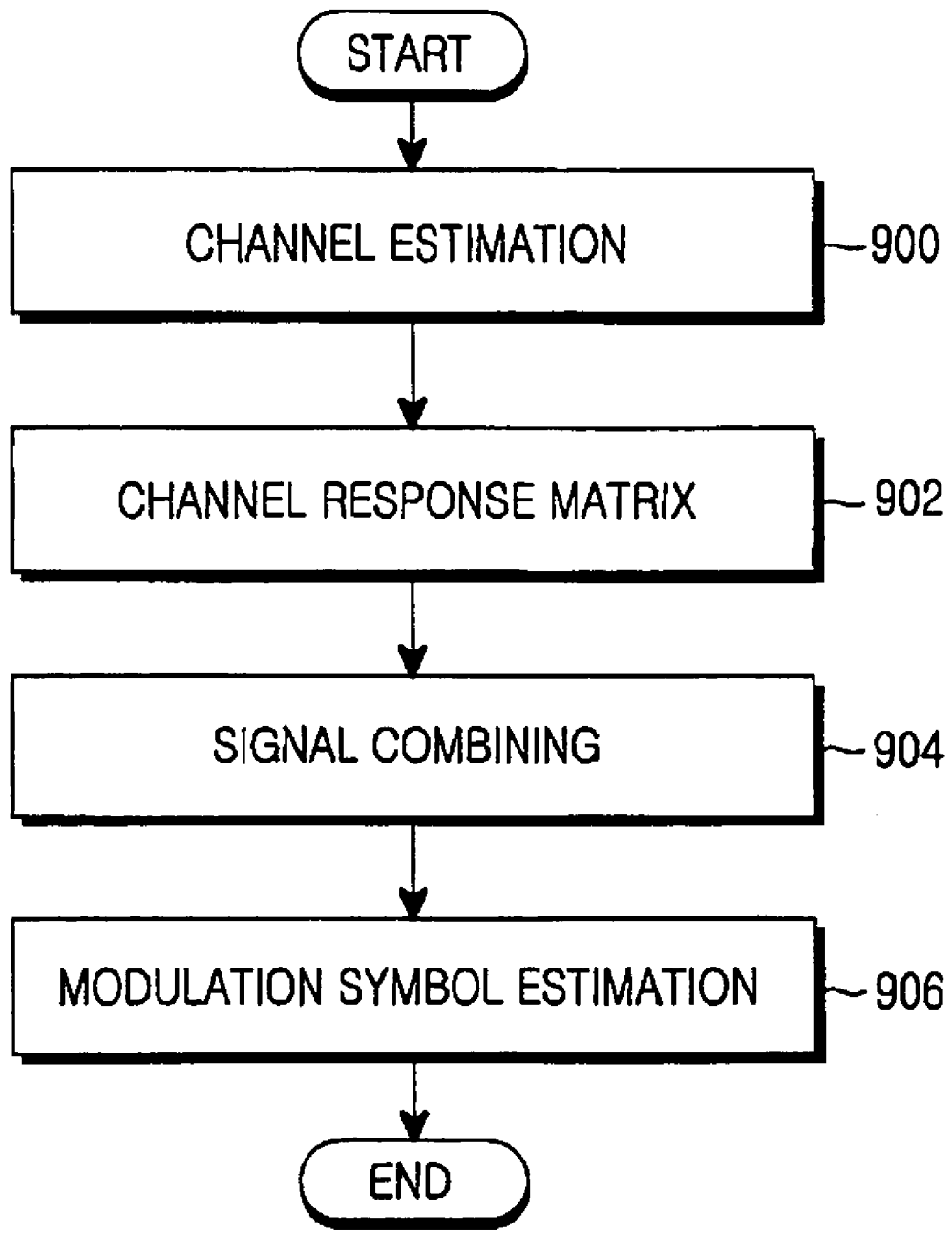
FIG. 9 is a flowchart illustrating a reception operation in the receiver illustrated in FIG. 8.

The operation of the receiver illustrated in FIG. 8 will now be described below with reference to FIG. 9. FIG. 9 is a flowchart illustrating a reception operation in the receiver in the OFDM mobile communication system using the SFBC scheme according to the embodiment of the present invention. The receiver OFDM-demodulates signals received through the Rx antennas and estimates channel coefficients representing channel gains between the transmitter and the receiver from the OFDM-demodulated data in step 900. In step 902, the receiver generates a channel response matrix $H_{new}$ using the channel coefficients. As stated before, the channel response matrix $H_{new}$ is the product of a channel coefficient matrix H generated using the channel coefficients and a predetermined pre-coding matrix $\Theta$. The receiver produces a vector including $N_t$ symbols by combining the OFDM-demodulated data with the channel response matrix $H_{new}$ in a predetermined method in step 904. The Hermitian matrix of the channel response matrix $H_{new}$ is calculated and a vector transmitted by the transmitter is achieved by multiplying the Hermitian matrix by the OFDM-demodulated data. In step 906, the receiver divides the vector into two vectors and decides the symbols transmitted from the transmitter by ML-decoding the individual vectors. These symbols are recovered to the original information data through demodulation and decoding.

As described above, while the use of an existing Vandermonde matrix as a pre-coding matrix requires ML-decoding for size 4, ML-decoding for size 2 suffices in relation to the pre-coding matrix of the present invention, resulting in a significant decrease in complexity (computation volume). In order to maximize coding gain, the pre-coding matrix needs to be optimized. The optimization of the pre-coding matrix is done by mathematical knowledge or simulation, as stated before. Optimization of a pre-coding matrix for four Tx antennas, for instance, is evaluated below.

Figure 10:
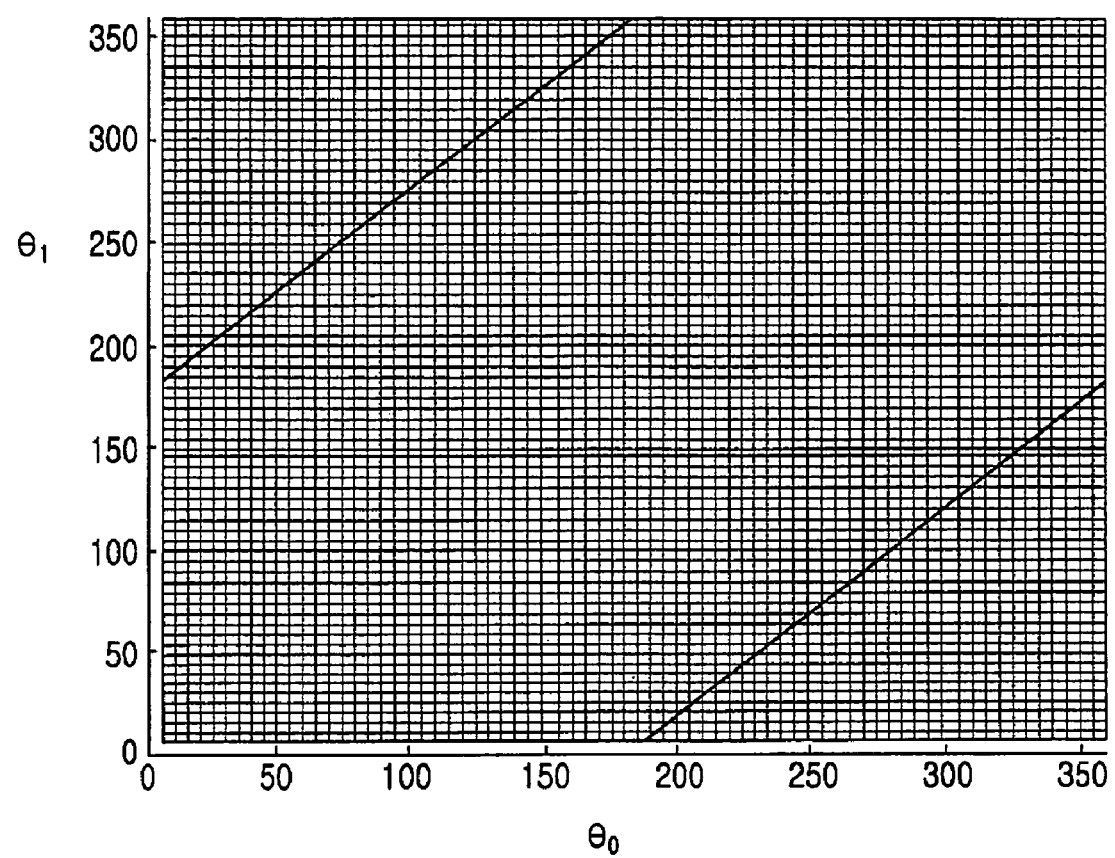
FIG. 10 is a graph illustrating simulated coding gains in the case where θ$_0$ and θ$_1$ are changed from 0° to 360°, each time by 1° with respect to a$_0$=exp$^{-j\theta_0}$ and a$_1$=exp$^{-j\theta_1}$ (0≦θ$_0$, θ$_1$≦2π) in a pre-coding matrix of the present invention.

FIG. 10 is a graph illustrating simulated coding gains in the case where $\theta_0$ and $\theta_1$ are changed from 0° to 360°, each time by 1° with respect to $a_0 = \exp^{-j\theta_0}$ and $a_1 = \exp^{-j\theta_1}$ ($0 \leq \theta_0, \theta_1 \leq 2\pi$) in the pre-coding matrix of Equation (14) according to the present invention. Referring to FIG. 10, the x axis represents values of $\theta_0$, the y axis represents values of $\theta_1$, and the z axis(not shown) represents coding gains. Bold lines indicate values of $\theta_0$ and values of $\theta_1$ with a maximal coding gain. As illustrated in FIG. 10, the following condition shown in Equation (22) must be satisfied to maximize the coding gain.

$$|\theta_1 - \theta_0| = 180° \quad (22)$$

The same performance is achieved for all $\theta_0$ and $\theta_1$ values that satisfy Equation (22). Therefore, many SFBCs can be designed using pre-coding matrices of the present invention.

Figure 11:
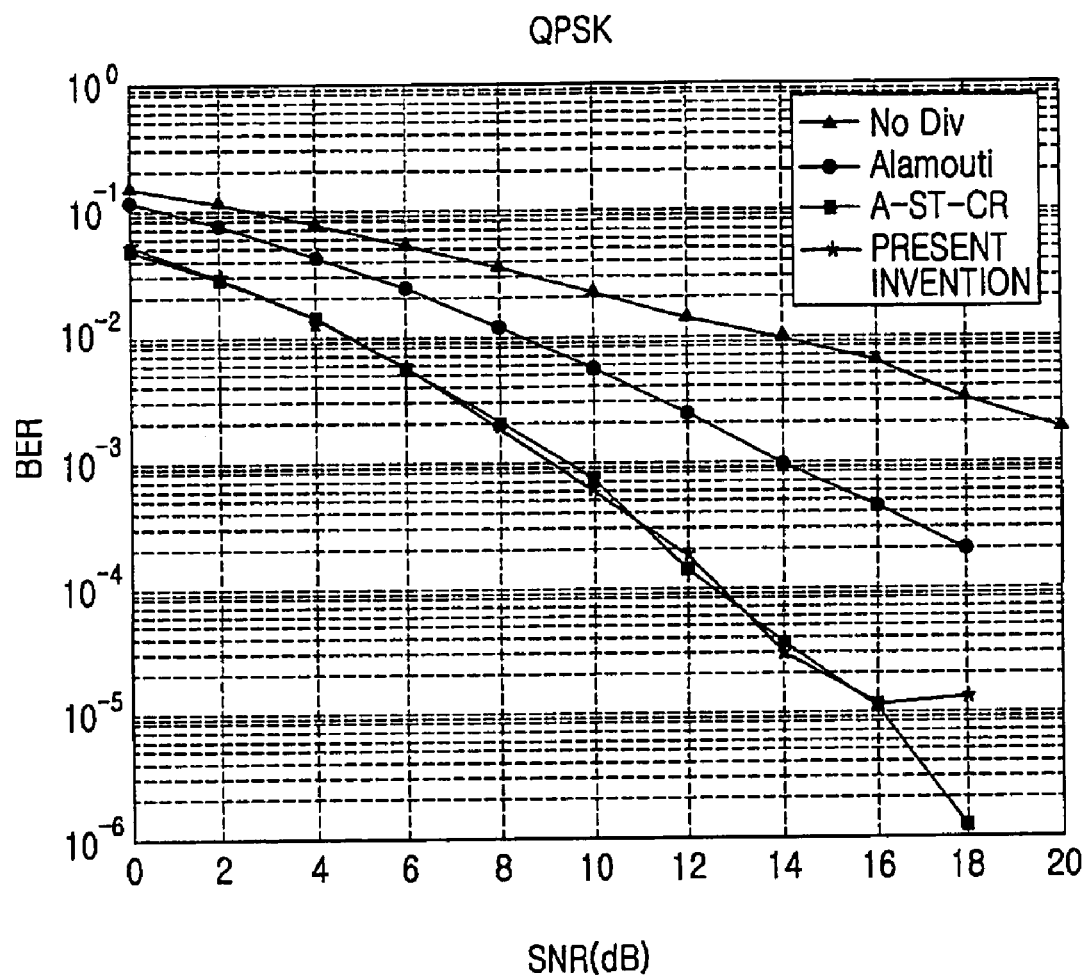
FIG. 11 is a graph comparing the SFBC scheme of the present invention with conventional STBC schemes in performance.

A comparison between conventional STBC schemes and the SFBC scheme of the present invention in terms of decoding complexity is presented below. FIG. 11 is a graph illustrating a comparison in performance between the SFBC scheme of the present invention and conventional STBC schemes. The performance curves shown in FIG. 11 are about the SFBC scheme of the present invention, the Alamouti STBC scheme (Alamouti), the Alamouti FDFR STBC scheme of Taejin Jung and Kyungwhoon Cheun (A-ST-CR), and no diversity (No Div).

The modulation scheme used for the performance comparison is QPSK. The x axis represents signal-to-noise ratio (SNR) and the y axis represents bit error rate (BER). As noted, for the same channel or the same SNR, the present invention and the Alamouti FDFR STBC scheme achieve excellent performance in BER, compared to the other schemes. Compared to the Alamouti FDFR STBC scheme, the present invention remarkably decreases coding and decoding complexities, that is, computation volume.

For $2^m$ complex signals, a pre-coder in the Alamouti FDFR STBC scheme has a decoding complexity of $(2^m)^4$, while the pre-coder of the present invention has a far less decoding complexity of $2 \times (2^m)^2$. For 16QAM, for instance, the decoding complexity is $C_{old} = (2^4)^4 = 2^{16}$ in the conventional pre-coder and $C_{new}=2(2^4)^2=2^9$ in the pre-coder of the present invention. Thus, $$\frac{C_{new}}{C_{old}} = 0.0078,$$

which implies that the present invention decreases computational volume considerably.

As described above, the present invention proposes an SFBC scheme for application to an OFDM system. The SFBC scheme advantageously minimizes coding and decoding complexities (computation volume), achieving a full diversity gain and a full rate.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A transmitter using a plurality of (Nt) transmit antennas in a communication system, comprising:
   a pre-coder for pre-coding an input symbol sequence using a pre-coding matrix, the pre-coding matrix being produced by puncturing a unitary matrix in a predetermined method; and
   a space-frequency coder for generating a plurality of vectors by grouping the symbols of the pre-coded symbol sequence by twos, space-frequency mapping each of the vectors by encoding each of the vectors in an Alamouti coding scheme, and providing each of the space-frequency mapped symbols to a predetermined Orthogonal Frequency Division Multiplexing (OFDM) modulator;
   wherein if a number of the transmit antennas is an even number (Nt=even number), the pre-coding matrix is $$\Theta = \frac{1}{\sqrt{N_t/2}} \begin{bmatrix} 1 & a_0^1 & \cdots & a_0^{N_t/2-1} & 0 & 0 & \cdots & 0 \\ 0 & 0 & \cdots & 0 & 1 & a_0^1 & \cdots & a_0^{N_t/2-1} \\ \vdots & \vdots & \ddots & \cdots & \cdots & \ddots & \vdots & \vdots \\ 1 & a_{N_t-2}^1 & \cdots & a_{N_t-2}^{N_t/2-1} & 0 & 0 & \cdots & 0 \\ 0 & 0 & \cdots & 0 & 1 & a_{N_t-2}^1 & \cdots & a_{N_t-2}^{N_t/2-1} \end{bmatrix}$$

where $a_i = \exp(2\pi(i1/4)/N_t)$, $i=0, 1, 2, \ldots, N_t/2-1$, and
wherein the pre-coding matrix is produced by puncturing predetermined $$\frac{N_t}{2}$$

columns in an $N_t \times N_t$ Vandermonde matrix, sequentially grouping the rows of the punctured matrix by twos, and shifting one row of each group.

2. The transmitter of claim 1, wherein the coding matrix for the space-frequency encoding is $$S = \begin{bmatrix} r_1 & -r_2^* & 0 & 0 & \cdots & 0 \\ r_2 & r_1^* & 0 & 0 & \cdots & 0 \\ 0 & 0 & r_3 & -r_4^* & 0 & 0 \\ 0 & 0 & r_4 & r_3^* & 0 & 0 \\ \vdots & \vdots & \ddots & \ddots & \vdots & \vdots \\ 0 & 0 & \cdots & \cdots & r_{N_t-1} & -r_{N_t}^* \\ 0 & 0 & \cdots & \cdots & r_{N_t} & r_{N_t-1}^* \end{bmatrix}$$

where $r_1, r_2, \ldots, r_N$, is the symbol sequence output from the pre-coder, an $i^{th}$ row of the matrix S is mapped to an $i^{th}$ subcarrier counted from a predetermined reference, and a $j^{th}$ column is mapped to a $j^{th}$ transmit antenna.

3. The transmitter of claim 1, further comprising a plurality of OFDM modulators for inverse-fast-Fourier-transform (IFFT)-processing each of the vectors received from the space-frequency coder by allocating each of the vectors to predetermined successive subcarriers, converting the IFFT signals to radio frequency (RF) signals, and transmitting the RF signals to predetermined transmit antennas.

4. The transmitter of claim 3, further comprising:
   a coder for generating code symbols by encoding transmission data; and
   a modulator for modulating the code symbols and providing the modulated code symbols to the pre-coder.

5. The transmitter of claim 1, wherein if the number of transmit antennas is 4 ($N_t$=4), the pre-coding matrix is $$\Theta = \frac{1}{\sqrt{2}} \begin{bmatrix} 1 & e^{-j\theta_0} & 0 & 0 \\ 0 & 0 & 1 & e^{-j\theta_0} \\ 1 & e^{-j\theta_1} & 0 & 0 \\ 0 & 0 & 1 & e^{-j\theta_1} \end{bmatrix}$$

where $0 \leq \theta_0, \theta_1 \leq 2\pi$, and $|\theta_1 - \theta_2| = 180°$.

6. The transmitter of claim 1, wherein if the number of transmit antennas is ($N_t$=6), the pre-coding matrix is $$\Theta = \frac{1}{\sqrt{3}} \begin{bmatrix} 1 & e^{-j\frac{5}{9}\pi} & e^{-j\frac{10}{9}\pi} & 0 & 0 & 0 \\ 0 & 0 & 0 & 1 & e^{-j\frac{5}{9}\pi} & e^{-j\frac{10}{9}\pi} \\ 1 & e^{-j\frac{11}{9}\pi} & e^{-j\frac{4}{9}\pi} & 0 & 0 & 0 \\ 0 & 0 & 0 & 1 & e^{-j\frac{11}{9}\pi} & e^{-j\frac{4}{9}\pi} \\ 1 & e^{-j\frac{17}{9}\pi} & e^{-j\frac{16}{9}\pi} & 0 & 0 & 0 \\ 0 & 0 & 0 & 1 & e^{-j\frac{17}{9}\pi} & e^{-j\frac{16}{9}\pi} \end{bmatrix}$$

7. A receiver in a communication system, the communication system having a transmitter that uses a plurality of ($N_t$) transmit antennas, the receiver comprising:
   at least one demodulator for demodulating a signal received through at least one receive antenna;
   a matrix generator for generating a channel response matrix by multiplying a channel coefficient matrix (H) by a predetermined pre-coding matrix ($\Theta$), wherein the pre-coding matrix is produced by puncturing predetermined $$\frac{N_t}{2}$$

columns in an $N_t \times N_t$ Vandermonde matrix, sequentially grouping the rows of the punctured Vandermonde matrix by twos, and shifting one row of each group; and a signal combiner for calculating a Hermitian matrix of the channel response matrix, calculating a vector of size $N_t$ by multiplying the Hermitian matrix by the demodulated signal, and dividing the vector into two vectors;

wherein if a number of the transmit antennas is an even number ($N_t$=even number), the pre-coding matrix is $$\Theta = \frac{1}{\sqrt{N_t/2}} \begin{bmatrix} 1 & \alpha_0^1 & \cdots & \alpha_0^{N_t/2-1} & 0 & 0 & \cdots & 0 \\ 0 & 0 & \cdots & 0 & 1 & \alpha_0^1 & \cdots & \alpha_0^{N_t/2-1} \\ \vdots & \vdots & \ddots & \cdots & \cdots & \ddots & \vdots & \vdots \\ 1 & \alpha_{N_t-2}^1 & \cdots & \alpha_{N_t-2}^{N_t/2-1} & 0 & 0 & \cdots & 0 \\ 0 & 0 & \cdots & 0 & 1 & \alpha_{N_t-2}^1 & \cdots & \alpha_{N_t-2}^{N_t/2-1} \end{bmatrix}$$

where $a_i = \exp(j2\pi(i+\frac{1}{4})/N_t)$, $i=0, 1, 2, \ldots, N_t/2-1$.

8. The receiver of claim 7, further comprising a signal decider for estimating symbols transmitted from the transmitter by decoding each of the two vectors received from the signal combiner in a predetermined decoding method.

9. The receiver of claim 8, wherein the decoding method is maximum likelihood (ML) decoding.

10. The receiver of claim 8, further comprising:
a channel estimator for calculating channel coefficients using the demodulated signal and providing the channel coefficients to the matrix generator;
a demodulator for demodulating estimated symbols received from the signal decider; and
a decoder for decoding the demodulated symbols received from the demodulator.

11. The receiver of claim 7, wherein if the number of transmit antennas is 4 ($N_t$=4), the pre-coding matrix is $$\Theta = \frac{1}{\sqrt{2}} \begin{bmatrix} 1 & e^{-j\theta_0} & 0 & 0 \\ 0 & 0 & 1 & e^{-j\theta_0} \\ 1 & e^{-j\theta_1} & 0 & 0 \\ 0 & 0 & 1 & e^{-j\theta_1} \end{bmatrix}$$

where $0 \leq \theta_0, \theta_1 \leq 2\pi$, and $|\theta_1 - \theta_2| = 180°$.

12. The receiver of claim 7, wherein if the number of transmit antennas is 6 ($N_t$=6), the pre-coding matrix is $$\Theta = \frac{1}{\sqrt{3}} \begin{bmatrix} 1 & e^{-j\frac{5}{9}\pi} & e^{-j\frac{10}{9}\pi} & 0 & 0 & 0 \\ 0 & 0 & 0 & 1 & e^{-j\frac{5}{9}\pi} & e^{-j\frac{10}{9}\pi} \\ 1 & e^{-j\frac{11}{9}\pi} & e^{-j\frac{4}{9}\pi} & 0 & 0 & 0 \\ 0 & 0 & 0 & 1 & e^{-j\frac{11}{9}\pi} & e^{-j\frac{4}{9}\pi} \\ 1 & e^{-j\frac{17}{9}\pi} & e^{-j\frac{16}{9}\pi} & 0 & 0 & 0 \\ 0 & 0 & 0 & 1 & e^{-j\frac{17}{9}\pi} & e^{-j\frac{16}{9}\pi} \end{bmatrix}$$

13. A transmission method in a communication system using a plurality of ($N_t$) transmit antennas, comprising the steps of:
pre-coding an input complex symbol sequence using a pre-coding matrix, the pre-coding matrix being produced by puncturing a unitary matrix in a predetermined method;

generating a plurality of vectors by the symbols of the pre-coded symbol sequence by twos;

space-frequency encoding each of the vectors by encoding each of the vectors in an Alamouti coding scheme; and providing each of the space-frequency encoded symbols to a predetermined Orthogonal Frequency Division Multiplexing (OFDM) modulator;

wherein if a number the of transmit antennas is an even number ($N_t$=even number), the pre-coding matrix is $$\Theta = \frac{1}{\sqrt{N_t/2}} \begin{bmatrix} 1 & \alpha_0^1 & \cdots & \alpha_0^{N_t/2-1} & 0 & 0 & \cdots & 0 \\ 0 & 0 & \cdots & 0 & 1 & \alpha_0^1 & \cdots & \alpha_0^{N_t/2-1} \\ \vdots & \vdots & \ddots & \cdots & \cdots & \ddots & \vdots & \vdots \\ 1 & \alpha_{N_t-2}^1 & \cdots & \alpha_{N_t-2}^{N_t/2-1} & 0 & 0 & \cdots & 0 \\ 0 & 0 & \cdots & 0 & 1 & \alpha_{N_t-2}^1 & \cdots & \alpha_{N_t-2}^{N_t/2-1} \end{bmatrix}$$

where $\alpha_i = \exp(j2\pi(i+\frac{1}{4})/N_t)$, $i=0, 1, 2, \ldots, N_t/2-1$, and wherein the pre-coding matrix is produced by puncturing predetermined $$\frac{N_t}{2}$$

columns in an $N_t \times N_t$ Vandermonde matrix, sequentially grouping the rows of the punctured matrix by twos, and shifting one row of each group.

14. The transmission method of claim 13, wherein the coding matrix for the space frequency encoding is $$S = \begin{bmatrix} r_1 & -r_2^* & 0 & 0 & \cdots & 0 \\ r_2 & r_1^* & 0 & 0 & \cdots & 0 \\ 0 & 0 & r_3 & -r_4^* & 0 & 0 \\ 0 & 0 & r_4 & r_3^* & 0 & 0 \\ \vdots & \vdots & \ddots & \ddots & \vdots & \vdots \\ 0 & 0 & \cdots & \cdots & r_{N_t-1} & -r_{N_t}^* \\ 0 & 0 & \cdots & \cdots & r_{N_t} & r_{N_t-1}^* \end{bmatrix}$$

where $r_1, r_2, \ldots, r_N$, is the pre-coded symbol sequence, an $i^{th}$ row of the matrix S is mapped to an $i^{th}$ subcarrier counted from a predetermined reference, and a $j^{th}$ column is mapped to a $j^{th}$ transmit antenna.

15. The transmission method of claim 13, further comprising the step of inverse-fast-Fourier-transform (IFFT)-processing each of a plurality of vectors generated by the space-frequency encoding by allocating each of the vectors to predetermined successive subcarriers, converting the IFFT signals to radio frequency (RF) signals, and transmitting the RF signals to predetermined antennas.

16. The transmission method of claim 15, further comprising the steps of:
generating code symbols by encoding transmission data; and
generating the complex symbol sequence by modulating the code symbols.

17. The transmission method of claim 13, wherein if the number of transmit antennas is 4 ($N_t=4$), the pre-coding matrix is $$\Theta = \frac{1}{\sqrt{2}} \begin{bmatrix} 1 & e^{-j\theta_0} & 0 & 0 \\ 0 & 0 & 1 & e^{-j\theta_0} \\ 1 & e^{-j\theta_1} & 0 & 0 \\ 0 & 0 & 1 & e^{-j\theta_1} \end{bmatrix}$$

where $0 \leq \theta_0, \theta_1 \leq 2\pi$, and $|\theta_1 - \theta_2| = 180°$.

18. The transmission method of claim 13, wherein if the number of transmit antennas is ($N_t=6$), the pre-coding matrix is $$\Theta = \frac{1}{\sqrt{3}} \begin{bmatrix} 1 & e^{-j\frac{5}{9}\pi} & e^{-j\frac{10}{9}\pi} & 0 & 0 & 0 \\ 0 & 0 & 0 & 1 & e^{-j\frac{5}{9}\pi} & e^{-j\frac{10}{9}\pi} \\ 1 & e^{-j\frac{11}{9}\pi} & e^{-j\frac{4}{9}\pi} & 0 & 0 & 0 \\ 0 & 0 & 0 & 1 & e^{-j\frac{11}{9}\pi} & e^{-j\frac{4}{9}\pi} \\ 1 & e^{-j\frac{17}{9}\pi} & e^{-j\frac{16}{9}\pi} & 0 & 0 & 0 \\ 0 & 0 & 0 & 1 & e^{-j\frac{17}{9}\pi} & e^{-j\frac{16}{9}\pi} \end{bmatrix}.$$

19. A reception method in a communication system, the communication system having a transmitter that uses a plurality of ($N_t$) transmit antennas, the reception method comprising the steps of:

demodulating a signal received through at least one receive antenna;

generating a channel response matrix by multiplying a channel coefficient matrix (H) by a predetermined pre-coding matrix ($\Theta$), wherein the pre-coding matrix is produced by puncturing predetermined $$\frac{N_t}{2}$$

columns in an $N_t \times N_t$ Vandermonde matrix, sequentially grouping the rows of the punctured Vandermonde matrix by twos, and shifting one row of each group;

calculating a Hermitian matrix of the channel response matrix, calculating a vector of size $N_t$ by multiplying the Hermitian matrix by the demodulated signal, and dividing the vector into two vectors; and estimating symbols transmitted from the transmitter by decoding each of the two vectors in a predetermined decoding method;

wherein if a number of the transmit antennas is an even number ($N_t$=even number), the pre-coding matrix is $$\Theta = \frac{1}{\sqrt{N_t/2}} \begin{bmatrix} 1 & a_0^1 & \ldots & a_0^{N_t/2-1} & 0 & 0 & \ldots & 0 \\ 0 & 0 & \ldots & 0 & 1 & a_0^1 & \ldots & a_0^{N_t/2-1} \\ \vdots & \vdots & \ddots & \ldots & \ldots & \ddots & \vdots & \vdots \\ 1 & a_{N_t-2}^1 & \ldots & a_{N_t-2}^{N_t/2-1} & 0 & 0 & \ldots & 0 \\ 0 & 0 & \ldots & 0 & 1 & a_{N_t-2}^1 & \ldots & a_{N_t-2}^{N_t/2-1} \end{bmatrix}$$

where $a_i = \exp(j2\pi(i+\frac{1}{4})/N_t)$, $i=0, 1, 2, \ldots, N_t/2-1$.

20. The reception method of claim 19, wherein the decoding method is maximum likelihood (ML) decoding.

21. The reception method of claim 19, further comprising the steps of:

generating the channel coefficient matrix by calculating channel coefficients using the demodulated signal;

demodulating the estimated symbols; and recovering original information data by decoding the demodulated symbols.

22. The reception method of claim 19, wherein if the number of transmit antennas is 4 ($N_t=4$), the pre-coding matrix is $$\Theta = \frac{1}{\sqrt{2}} \begin{bmatrix} 1 & e^{-j\theta_0} & 0 & 0 \\ 0 & 0 & 1 & e^{-j\theta_0} \\ 1 & e^{-j\theta_1} & 0 & 0 \\ 0 & 0 & 1 & e^{-j\theta_1} \end{bmatrix}$$

where $0 \leq \theta_0, \theta_1 \leq 2\pi$, and $|\theta_1 - \theta_2| = 180°$.

23. The reception method of claim 19, wherein if the number of transmit antennas is 6 ($N_t=6$), the pre-coding matrix is $$\Theta = \frac{1}{\sqrt{3}} \begin{bmatrix} 1 & e^{-j\frac{5}{9}\pi} & e^{-j\frac{10}{9}\pi} & 0 & 0 & 0 \\ 0 & 0 & 0 & 1 & e^{-j\frac{5}{9}\pi} & e^{-j\frac{10}{9}\pi} \\ 1 & e^{-j\frac{11}{9}\pi} & e^{-j\frac{4}{9}\pi} & 0 & 0 & 0 \\ 0 & 0 & 0 & 1 & e^{-j\frac{11}{9}\pi} & e^{-j\frac{4}{9}\pi} \\ 1 & e^{-j\frac{17}{9}\pi} & e^{-j\frac{16}{9}\pi} & 0 & 0 & 0 \\ 0 & 0 & 0 & 1 & e^{-j\frac{17}{9}\pi} & e^{-j\frac{16}{9}\pi} \end{bmatrix}$$

* * * * *

UNITED STATES PATENT AND TRADEMARK OFFICE
CERTIFICATE OF CORRECTION

PATENT NO. : 7,606,320 B2 Page 1 of 1
APPLICATION NO. : 11/156689
DATED : October 20, 2009
INVENTOR(S) : Chae et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1114 days.

Signed and Sealed this

Fifth Day of October, 2010

David J. Kappos
*Director of the United States Patent and Trademark Office*